(No Model.)
A. G. PATTON.
WAFFLE IRON.
No. 287,713. Patented Oct. 30, 1883.
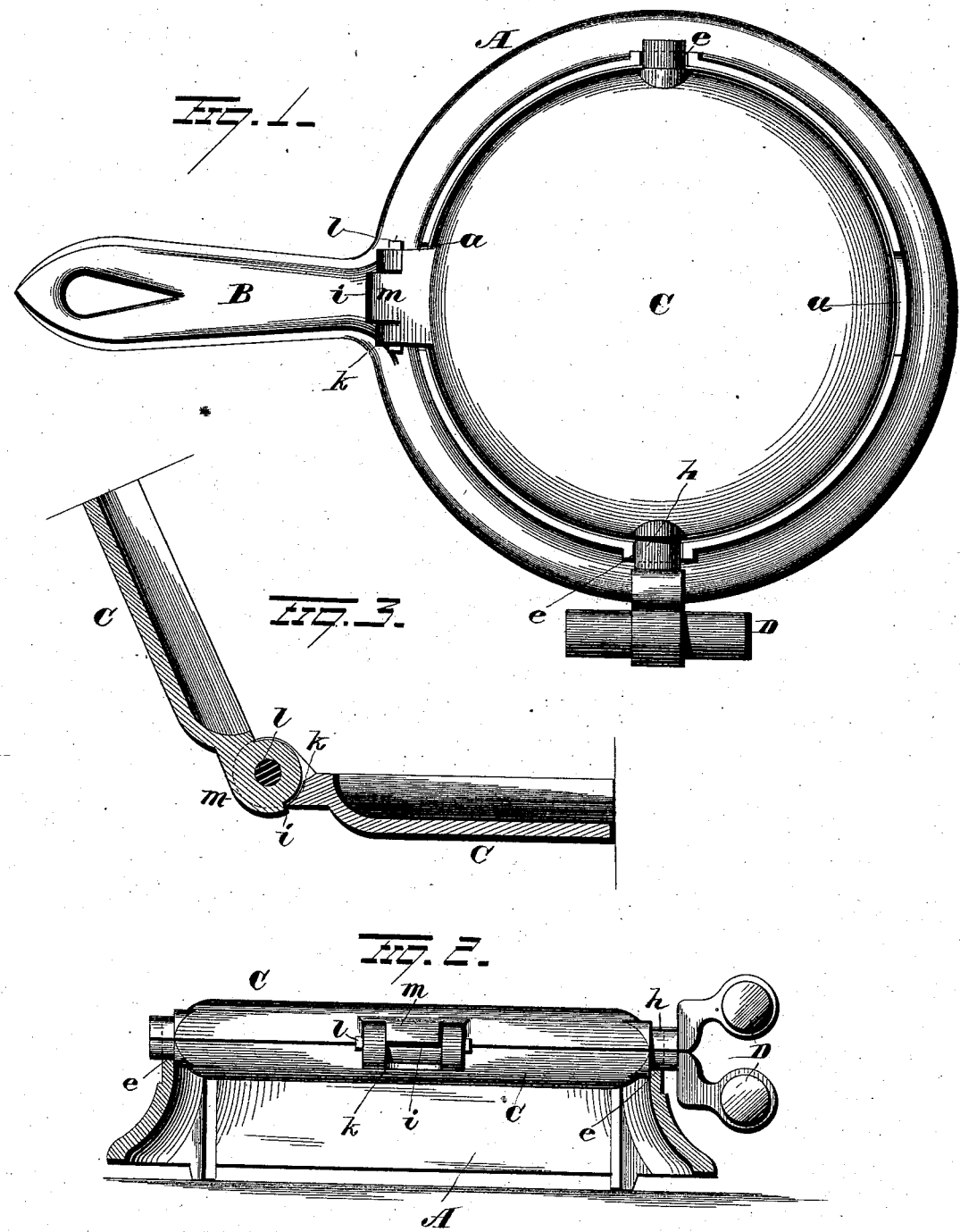

UNITED STATES PATENT OFFICE.

ALEXANDER G. PATTON, OF COLUMBUS, OHIO, ASSIGNOR TO THE PATTON MANUFACTURING COMPANY, OF SAME PLACE.

WAFFLE-IRON.

SPECIFICATION forming part of Letters Patent No. 287,713, dated October 30, 1883.

Application filed June 28, 1883. (No model.)

*To all whom it may concern:*

Be it known that I, ALEXANDER G. PATTON, of Columbus, in the county of Franklin and State of Ohio, have invented certain new and useful Improvements in Waffle-Irons; and I do hereby declare the following to be a full, clear, and exact description of the invention, such as will enable others skilled in the art to which it appertains to make and use the same.

My invention relates to an improvement in waffle-irons, the object of the same being to provide said irons with such hinges that when the cups are opened at a little more than right angles a shoulder or stop on the back of the hinge makes them self-supporting, independent of the bearing in the ring or frame.

A further object of my improvement is to construct the iron so that the hinge on the cups will always rest in line with the handle on the ring, and thus give a more perfect balance to the whole iron.

A further object is to construct the iron with the handles on the sides, so that it may be manipulated from either side of the ring, and thus make it convenient to use the same on either side of the stove.

With these ends in view my invention consists in certain details of construction, as will be hereinafter fully described, and pointed out in the claims.

In the accompanying drawings, Figure 1 is a plan view of my improvement. Fig. 2 is a sectional view of the same. Fig. 3 is a detached view of the hinge.

A represents the iron base or frame, provided with the handle B, and the recesses *a*, formed in line with the handle B, which are adapted to receive the hinge on the cups C. Each of the cups is provided on its sides with a semicircular journal adapted to fit in suitable bearings, *e*, formed in the ring A, said journals of the opposite cups registering with each other. The journals *h* on one side of the cups are extended and form the handles D, the same being at right angles with the hinge of the cups, and also with the handle B. By thus forming the handles on the sides of the cups the latter are more readily and easily opened or closed, and more convenient to the operator.

The hinge of the cups is preferably constructed as follows: One leaf, *m*, of the hinge on one cup fits between the arms of the leaf *k* on the other cup, the pintle *l* pivotally securing the two together. The leaf *m* is provided with a shoulder, *i*, which is adapted to strike the leaf *k* when the two cups are opened at a little more than right angles, and thus secure them in open position independent of the ring or base A. I am aware that hinges the members or leaves of which bear on the ring or base of the iron, for the purpose of holding the upper cup in open adjustment, have heretofore been employed; but they are objectionable in that they are necessarily long, and are liable to be easily broken off. This hinge is adapted to rest in the recesses *a*, and always opens or closes in line with the handle B, thus preserving an equal balance, the handles on the side of the cups facilitating the opening or closing of the same.

By constructing the parts as above described it will be seen that by reversing the cups they may be manipulated on the opposite side of the rings, thereby rendering the iron capable of being operated on either side of the stove.

As many changes might be made in the improvement without departing from the spirit of my invention, I would have it understood that I do not limit myself to the exact construction shown and described, but consider myself at liberty to make such slight changes as fairly fall within the spirit and scope of my invention.

Having fully described my invention, what I claim as new, and desire to secure by Letters Patent, is—

1. The combination, with a suitable base or frame provided with a handle, of cups hinged so as to open and shut in line with the handle of the frame, the said cups being respectively provided with a handle located at right angles with the hinge thereof and with the handle of the frame, substantially as set forth.

2. The combination, with a base or ring provided with a handle and recesses in line with the latter, of cups provided with journals adapted to fit in suitable bearings in the ring, said cups being so hinged together that when opened at a little more than right angles the hinge will hold them in that position independent of the ring, substantially as set forth.

3. The combination, with a base or frame provided with a handle and recesses in line with the latter, of cups hinged together, each provided with semicircular journals registering with each other and adapted to fit in bearings in the ring, the hinge connecting said cups being adapted to fit in said recesses and to hold the cups in open position independent of the frame, substantially as set forth.

4. The combination, with a base or frame provided with a handle and recesses in line with the latter, of cups hinged together and adapted to rest in said frame, one leaf of the hinge on one cup being provided with a shoulder which impinges against the leaf on the other cup, thereby holding the cups in open position independent of the base, substantially as set forth.

In testimony whereof I have signed this specification in the presence of two subscribing witnesses.

ALEXANDER G. PATTON.

Witnesses:
L. T. STRADER,
WM. D. PATTON.